(12) United States Patent
Mohan et al.

(10) Patent No.: US 12,360,812 B2
(45) Date of Patent: Jul. 15, 2025

(54) METHOD, SYSTEM, AND COMPUTER PROGRAM PRODUCT FOR DYNAMIC DATA ALLOCATION TO NODES IN DISTRIBUTED SYSTEMS

(71) Applicant: Visa International Service Association, San Francisco, CA (US)

(72) Inventors: Shivam Mohan, Lucknow (IN); Sudharshan Krishnakumar Gaddam, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/844,249

(22) PCT Filed: Nov. 30, 2023

(86) PCT No.: PCT/US2023/081769
§ 371 (c)(1),
(2) Date: Sep. 5, 2024

(87) PCT Pub. No.: WO2025/116906
PCT Pub. Date: Jun. 5, 2025

(65) Prior Publication Data
US 2025/0181405 A1    Jun. 5, 2025

(51) Int. Cl.
*G06F 9/50*    (2006.01)
(52) U.S. Cl.
CPC ............................... *G06F 9/5027* (2013.01)
(58) Field of Classification Search
None
See application file for complete search history.

(56) References Cited

U.S. PATENT DOCUMENTS 10,366,062 B1 *   7/2019   Lazier ................... G06F 3/0652
11,210,183 B2 * 12/2021   Navon ................... G06F 3/067
(Continued)

FOREIGN PATENT DOCUMENTS

CN    105068874 A    11/2015
CN    108429704 B    1/2022

OTHER PUBLICATIONS

Sreekumar et al; "Locality, Latency and Spatial-Aware Data Placement Strategies at the Edge"; University of Minnesota; arXiv: 2212.01984v2 [cs.DC] Apr. 7, 2023; (Sreekumar_2023.pdf; pp. 1-9) (Year: 2023).*

(Continued)

*Primary Examiner* — Hiren P Patel
(74) *Attorney, Agent, or Firm* — The Webb Law Firm

(57) ABSTRACT

Methods, systems, and computer program products are provided for dynamic data allocation to nodes in distributed systems. The method may include storing data blocks at nodes; receiving, from the nodes, node health data associated with the nodes; and for a data block, performing a dynamic data allocation including: receiving, from a node on which that data block was stored, age data associated with an age of that data block; receiving, from each client that accessed that data block at the node, network latency data associated with a network latency of that client for accessing that data block; generating, based on (i) the node health data, (ii) the age data, and (iii) the network latency data, a node assignment for that data block; and in response to determining that the node assignment is different than a current node, moving that data block from the current node to the node assignment.

14 Claims, 4 Drawing Sheets

(56) References Cited

U.S. PATENT DOCUMENTS

| | | | |
|---|---|---|---|
| 11,269,780 B2* | 3/2022 | Curewitz | G06F 12/0284 |
| 12,189,990 B2* | 1/2025 | Pu | G06F 3/0604 |
| 2003/0158908 A1* | 8/2003 | Jacobs | H04L 67/56 |
| | | | 709/214 |
| 2011/0016090 A1* | 1/2011 | Krishnaprasad | G06F 11/2094 |
| | | | 707/648 |
| 2014/0214447 A1* | 7/2014 | Brooker | G06F 11/0793 |
| | | | 705/2 |
| 2014/0297947 A1* | 10/2014 | Tamura | G06F 3/0649 |
| | | | 711/114 |
| 2017/0075946 A1* | 3/2017 | Bossa | G06F 16/2471 |
| 2019/0007206 A1 | 1/2019 | Surla et al. | |
| 2021/0149563 A1* | 5/2021 | Devriendt | G06F 3/067 |
| 2022/0011946 A1 | 1/2022 | Bernat et al. | |
| 2022/0150298 A1 | 5/2022 | Kurian et al. | |
| 2024/0393950 A1* | 11/2024 | Radi | G06F 3/0631 |

OTHER PUBLICATIONS

Charapko et al.; "Adapting to Access Locality via Live Data Migration in Globally Distributed Datastores"; 2018 IEEE International conference on Big Data; (Charapko_2018.pdf; pp. 3321-3330) (Year: 2018).*

Kang et al.; "User-Centric Data Migration in Networked Storage Systems"; IEEE 2008; (Kang_2008.pdf; pp. 1-12) (Year: 2008).*

Qin et al.; "Towards a Cost-Aware Data Migration Approach for Key-Value Stores"; 2012 IEEE International Conference on Cluster Computing; DOI 10.1109/CLUSTER.2012.14; (Qin_2012.pdf; pp. 551-556) (Year: 2012).*

* cited by examiner

METHOD, SYSTEM, AND COMPUTER PROGRAM PRODUCT FOR DYNAMIC DATA ALLOCATION TO NODES IN DISTRIBUTED SYSTEMS

CROSS REFERENCE TO RELATED APPLICATION

This application is the United States national phase of International Patent Application No. PCT/US23/81769 filed Nov. 30, 2023, the disclosure of which is hereby incorporated by reference in its entirety.

BACKGROUND

1. Technical Field

This disclosure relates generally to distributed computing and, in non-limiting embodiments or aspects, to methods, systems, and computer program products for dynamic data allocation to nodes in distributed systems.

2. Technical Considerations

Improving utilization of clusters or nodes is a common challenge faced in distributed computing. There are multiple factors that can contribute to sub-optimal utilization of clusters or nodes, such as how data is stored on a cluster or node, how expensive it is to retrieve the data from the cluster or node, and/or the like. For example, data may be stored in one or more data nodes that are positioned far from a client trying to access the data, or data may be stored on a hardware system of a data node that is unable to operate at a full capacity due to some reason.

This problem of suboptimal allocation of data on a distributed cluster is not a static one and may not be fixed by creating specific schemes. A more dynamic approach is needed to ensure that needs of clients that are trying to access the data are met and that the data storage schemes continuously evolve as the needs of the clients change. Further, the problem of efficient data storage is not limited to any specific format of data storage, such as file storage, object storage, and/or the like, and instead spans across a spectrum of data storage formats. Accordingly, there is a need for a dynamic data allocation solution that may not be limited to a particular use case.

SUMMARY

Accordingly, provided are improved methods, systems, and computer program products for dynamic data allocation to nodes in distributed systems.

According to non-limiting embodiments or aspects, provided is a method, including: storing, with at least one processor, a plurality of data blocks at a plurality of nodes in a distributed system; receiving, with the at least one processor, from the plurality of nodes, node health data associated with a plurality of read latencies associated with the plurality of nodes; and for a data block of the plurality of data blocks, performing, with the at least one processor, a dynamic data allocation including: receiving, from one or more nodes of the plurality of nodes on which that data block was stored in a prior time period, age data associated with an age of that data block in the distributed system; receiving, from each client of a number of clients that accessed that data block at the one or more nodes in the prior time period, network latency data associated with a network latency of that client for accessing that data block at the one or more nodes; generating, based on (i) the node health data, (ii) the age data, and (iii) the network latency data for each client of the number of clients that accessed that data block at the one or more nodes, a node assignment of a node of the plurality of nodes for that data block; determining whether the node of the node assignment for that data block is different than a current node on which that data block is currently stored; and in response to determining that the node of the node assignment for that data block is different than the current node on which that data block is currently stored, moving that data block from the current node to the node of the node assignment.

In some non-limiting embodiments or aspects, the node health data associated with the plurality of read latencies associated with the plurality of nodes includes, for each node of the plurality of nodes, a read latency including an average amount of time taken by that node to serve one or more requests for access to one or more data blocks at that node.

In some non-limiting embodiments or aspects, the node health data further includes a plurality of load factors associated with the plurality of nodes, and wherein, for the data block of the plurality of data blocks: the network latency data further includes a priority of level of each client of the number of clients that accessed that data block at the one or more nodes, and generating the node assignment of the node of the plurality of nodes for that data block is further based on the plurality of load factors associated with the plurality of nodes and a priority of level of each client of the number of clients that accessed that data block at the one or more nodes.

In some non-limiting embodiments or aspects, wherein, for the data block of the plurality of data blocks, the age data associated with the age of that data block includes a number of clients that accessed that data block at the one or more nodes in the prior time period and a total number of times that that data block was accessed at the one or more nodes in the prior time period.

In some non-limiting embodiments or aspects, the method further includes: for the data block of the plurality of data blocks, with the at least one processor: for each client of the number of clients that accessed that data block at the one or more nodes in the prior time period, determining, based on the network latency data associated with the network latency of that client for accessing that data block at the one or more nodes and the read latency of the one or more nodes, the network latency of that client for accessing that data block at the one or more nodes.

In some non-limiting embodiments or aspects, for the data block of the plurality of data blocks, generating the node assignment of the node of the plurality of nodes for that data block includes: providing, as input to a machine learning model, (i) the plurality of read latencies associated with the plurality of nodes, (ii) the number of clients that accessed that data block at the one or more nodes in the prior time period, (iii) the total number of times that that data block was accessed at the one or more nodes in the prior time period, and (iv), for each client of the number of clients that accessed that data block at the one or more nodes, the network latency of that client for accessing that data block at the one or more nodes; and receiving, as output from the machine learning model, the node assignment of the node of the plurality of nodes for that data block.

In some non-limiting embodiments or aspects, the method further includes: for each data block of the plurality of data blocks, continuously or periodically performing, with the at least one processor, the dynamic data allocation.

According to some non-limiting embodiments or aspects, provided is a system, including: at least one processor coupled to a memory and configured to: store a plurality of data blocks at a plurality of nodes in a distributed system; receive, from the plurality of nodes, node health data associated with a plurality of read latencies associated with the plurality of nodes; and for a data block of the plurality of data blocks, perform a dynamic data allocation including: receiving, from one or more nodes of the plurality of nodes on which that data block was stored in a prior time period, age data associated with an age of that data block in the distributed system; receiving, from each client of a number of clients that accessed that data block at the one or more nodes in the prior time period, network latency data associated with a network latency of that client for accessing that data block at the one or more nodes; generating, based on (i) the node health data, (ii) the age data, and (iii) the network latency data for each client of the number of clients that accessed that data block at the one or more nodes, a node assignment of a node of the plurality of nodes for that data block; determining whether the node of the node assignment for that data block is different than a current node on which that data block is currently stored; and in response to determining that the node of the node assignment for that data block is different than the current node on which that data block is currently stored, moving that data block from the current node to the node of the node assignment.

In some non-limiting embodiments or aspects, the node health data associated with the plurality of read latencies associated with the plurality of nodes includes, for each node of the plurality of nodes, a read latency including an average amount of time taken by that node to serve one or more requests for access to one or more data blocks at that node.

In some non-limiting embodiments or aspects, the node health data further includes a plurality of load factors associated with the plurality of nodes, and wherein, for the data block of the plurality of data blocks: the network latency data further includes a priority of level of each client of the number of clients that accessed that data block at the one or more nodes, and generating the node assignment of the node of the plurality of nodes for that data block is further based on the plurality of load factors associated with the plurality of nodes and a priority of level of each client of the number of clients that accessed that data block at the one or more nodes.

In some non-limiting embodiments or aspects, for the data block of the plurality of data blocks, the age data associated with the age of that data block includes a number of clients that accessed that data block at the one or more nodes in the prior time period and a total number of times that that data block was accessed at the one or more nodes in the prior time period.

In some non-limiting embodiments or aspects, the at least one processor is further configured to: for the data block of the plurality of data blocks: for each client of the number of clients that accessed that data block at the one or more nodes in the prior time period, determine, based on the network latency data associated with the network latency of that client for accessing that data block at the one or more nodes and the read latency of the one or more nodes, the network latency of that client for accessing that data block at the one or more nodes.

In some non-limiting embodiments or aspects, for the data block of the plurality of data blocks, generating the node assignment of the node of the plurality of nodes for that data block includes: providing, as input to a machine learning model, (i) the plurality of read latencies associated with the plurality of nodes, (ii) the number of clients that accessed that data block at the one or more nodes in the prior time period, (iii) the total number of times that that data block was accessed at the one or more nodes in the prior time period, and (iv), for each client of the number of clients that accessed that data block at the one or more nodes, the network latency of that client for accessing that data block at the one or more nodes; and receiving, as output from the machine learning model, the node assignment of the node of the plurality of nodes for that data block.

In some non-limiting embodiments or aspects, the at least one processor is further configured to: for each data block of the plurality of data blocks, continuously or periodically perform the dynamic data allocation.

According to some non-limiting embodiments or aspects, provided is a computer program product including at least one non-transitory computer-readable medium including program instructions that, when executed by at least one processor of a node of a plurality of nodes, cause the at least one processor to: store a plurality of data blocks at a plurality of nodes in a distributed system; receive, from the plurality of nodes, node health data associated with a plurality of read latencies associated with the plurality of nodes; and for a data block of the plurality of data blocks, perform a dynamic data allocation including: receiving, from one or more nodes of the plurality of nodes on which that data block was stored in a prior time period, age data associated with an age of that data block in the distributed system; receiving, from each client of a number of clients that accessed that data block at the one or more nodes in the prior time period, network latency data associated with a network latency of that client for accessing that data block at the one or more nodes; generating, based on (i) the node health data, (ii) the age data, and (iii) the network latency data for each client of the number of clients that accessed that data block at the one or more nodes, a node assignment of a node of the plurality of nodes for that data block; determining whether the node of the node assignment for that data block is different than a current node on which that data block is currently stored; and in response to determining that the node of the node assignment for that data block is different than the current node on which that data block is currently stored, moving that data block from the current node to the node of the node assignment.

In some non-limiting embodiments or aspects, the node health data associated with the plurality of read latencies associated with the plurality of nodes includes, for each node of the plurality of nodes, a read latency including an average amount of time taken by that node to serve one or more requests for access to one or more data blocks at that node.

In some non-limiting embodiments or aspects, the node health data further includes a plurality of load factors associated with the plurality of nodes, and wherein, for the data block of the plurality of data blocks: the network latency data further includes a priority of level of each client of the number of clients that accessed that data block at the one or more nodes, and generating the node assignment of the node of the plurality of nodes for that data block is further based on the plurality of load factors associated with the plurality of nodes and a priority of level of each client of the number of clients that accessed that data block at the one or more nodes.

In some non-limiting embodiments or aspects, for the data block of the plurality of data blocks, the age data associated with the age of that data block includes a number of clients that accessed that data block at the one or more nodes in the prior time period and a total number of times that that data block was accessed at the one or more nodes in the prior time period, and wherein the program instructions, when executed by the at least one processor, further cause the at least one processor to: for the data block of the plurality of data blocks: for each client of the number of clients that accessed that data block at the one or more nodes in the prior time period, determine, based on the network latency data associated with the network latency of that client for accessing that data block at the one or more nodes and the read latency of the one or more nodes, the network latency of that client for accessing that data block at the one or more nodes.

In some non-limiting embodiments or aspects, for the data block of the plurality of data blocks, generating the node assignment of the node of the plurality of nodes for that data block includes: providing, as input to a machine learning model, (i) the plurality of read latencies associated with the plurality of nodes, (ii) the number of clients that accessed that data block at the one or more nodes in the prior time period, (iii) the total number of times that that data block was accessed at the one or more nodes in the prior time period, and (iv) for each client of the number of clients that accessed that data block at the one or more nodes, the network latency of that client for accessing that data block at the one or more nodes; and receiving, as output from the machine learning model, the node assignment of the node of the plurality of nodes for that data block.

In some non-limiting embodiments or aspects, the program instructions, when executed by the at least one processor, further cause the at least one processor to: for each data block of the plurality of data blocks, continuously or periodically perform the dynamic data allocation.

Further non-limiting embodiments or aspects are set forth in the following numbered clauses:

Clause 1. A method, comprising: storing, with at least one processor, a plurality of data blocks at a plurality of nodes in a distributed system; receiving, with the at least one processor, from the plurality of nodes, node health data associated with a plurality of read latencies associated with the plurality of nodes; and for a data block of the plurality of data blocks, performing, with the at least one processor, a dynamic data allocation including: receiving, from one or more nodes of the plurality of nodes on which that data block was stored in a prior time period, age data associated with an age of that data block in the distributed system; receiving, from each client of a number of clients that accessed that data block at the one or more nodes in the prior time period, network latency data associated with a network latency of that client for accessing that data block at the one or more nodes; generating, based on (i) the node health data, (ii) the age data, and (iii) the network latency data for each client of the number of clients that accessed that data block at the one or more nodes, a node assignment of a node of the plurality of nodes for that data block; determining, whether the node of the node assignment for that data block is different than a current node on which that data block is currently stored; and in response to determining that the node of the node assignment for that data block is different than the current node on which that data block is currently stored, moving that data block from the current node to the node of the node assignment.

Clause 2. The method of clause 1, wherein the node health data associated with the plurality of read latencies associated with the plurality of nodes includes, for each node of the plurality of nodes, a read latency including an average amount of time taken by that node to serve one or more requests for access to one or more data blocks at that node.

Clause 3. The method of clause 1 or clause 2, wherein the node health data further includes a plurality of load factors associated with the plurality of nodes, and wherein, for the data block of the plurality of data blocks: the network latency data further includes a priority of level of each client of the number of clients that accessed that data block at the one or more nodes, and generating the node assignment of the node of the plurality of nodes for that data block is further based on the plurality of load factors associated with the plurality of nodes and a priority of level of each client of the number of clients that accessed that data block at the one or more nodes.

Clause 4. The method of any of clauses 1-3, wherein, for the data block of the plurality of data blocks, the age data associated with the age of that data block includes a number of clients that accessed that data block at the one or more nodes in the prior time period and a total number of times that that data block was accessed at the one or more nodes in the prior time period.

Clause 5. The method of any of clauses 1-4, further comprising: for the data block of the plurality of data blocks, with the at least one processor: for each client of the number of clients that accessed that data block at the one or more nodes in the prior time period, determining, based on the network latency data associated with the network latency of that client for accessing that data block at the one or more nodes and the read latency of the one or more nodes, the network latency of that client for accessing that data block at the one or more nodes.

Clause 6. The method of any of clauses 1-5, wherein, for the data block of the plurality of data blocks, generating the node assignment of the node of the plurality of nodes for that data block includes: providing, as input to a machine learning model, the (i) the plurality of read latencies associated with the plurality of nodes, (ii) the number of clients that accessed that data block at the one or more nodes in the prior time period, (iii) the total number of times that that data block was accessed at the one or more nodes in the prior time period, and (iv), for each client of the number of clients that accessed that data block at the one or more nodes, the network latency of that client for accessing that data block at the one or more nodes; and receiving, as output from the machine learning model, the node assignment of the node of the plurality of nodes for that data block.

Clause 7. The method of any of clauses 1-6, further comprising: for each data block of the plurality of data blocks, continuously or periodically performing, with the at least one processor, the dynamic data allocation.

Clause 8. A system, comprising: at least one processor coupled to a memory and configured to: store a plurality of data blocks at a plurality of nodes in a distributed system; receive, from the plurality of nodes, node health data associated with a plurality of read latencies associated with the plurality of nodes; and for a data block of the plurality of data blocks, perform a dynamic data allocation including: receiving, from one or more nodes of the plurality of nodes on which that data block was stored in a prior time period, age data associated with an age of that data block in the distributed system; receiving, from each client of a number of clients that accessed that data block at the one or more nodes in the prior time period, network latency data associated with a network latency of that client for accessing that data block at the one or more nodes; generating, based on (i) the node health data, (ii) the age data, and (iii) the network latency data for each client of the number of clients that accessed that data block at the one or more nodes, a node assignment of a node of the plurality of nodes for that data block; determining, whether the node of the node assignment for that data block is different than a current node on which that data block is currently stored; and in response to determining that the node of the node assignment for that data block is different than the current node on which that data block is currently stored, moving that data block from the current node to the node of the node assignment.

Clause 9. The system of clause 8, wherein the node health data associated with the plurality of read latencies associated with the plurality of nodes includes, for each node of the plurality of nodes, a read latency including an average amount of time taken by that node to serve one or more requests for access to one or more data blocks at that node.

Clause 10. The system of clause 8 or clause 9, wherein the node health data further includes a plurality of load factors associated with the plurality of nodes, and wherein, for the data block of the plurality of data blocks: the network latency data further includes a priority of level of each client of the number of clients that accessed that data block at the one or more nodes, and generating the node assignment of the node of the plurality of nodes for that data block is further based on the plurality of load factors associated with the plurality of nodes and a priority of level of each client of the number of clients that accessed that data block at the one or more nodes.

Clause 11. The system of any of clauses 8-10, wherein, for the data block of the plurality of data blocks, the age data associated with the age of that data block includes a number of clients that accessed that data block at the one or more nodes in the prior time period and a total number of times that that data block was accessed at the one or more nodes in the prior time period.

Clause 12. The system of any of clauses 8-11, wherein the at least one processor is further configured to: for the data block of the plurality of data blocks: for each client of the number of clients that accessed that data block at the one or more nodes in the prior time period, determine, based on the network latency data associated with the network latency of that client for accessing that data block at the one or more nodes and the read latency of the one or more nodes, the network latency of that client for accessing that data block at the one or more nodes.

Clause 13. The system of any of clauses 8-12, wherein, for the data block of the plurality of data blocks, generating the node assignment of the node of the plurality of nodes for that data block includes: providing, as input to a machine learning model, the (i) the plurality of read latencies associated with the plurality of nodes, (ii) the number of clients that accessed that data block at the one or more nodes in the prior time period, (iii) the total number of times that that data block was accessed at the one or more nodes in the prior time period, and (iv), for each client of the number of clients that accessed that data block at the one or more nodes, the network latency of that client for accessing that data block at the one or more nodes; and receiving, as output from the machine learning model, the node assignment of the node of the plurality of nodes for that data block.

Clause 14. The system of any of clauses 8-13, wherein the at least one processor is further configured to: for each data block of the plurality of data blocks, continuously or periodically perform the dynamic data allocation.

Clause 15. A computer program product comprising at least one non-transitory computer-readable medium including program instructions that, when executed by at least one processor of a node of a plurality of nodes, cause the at least one processor to: store a plurality of data blocks at a plurality of nodes in a distributed system; receive, from the plurality of nodes, node health data associated with a plurality of read latencies associated with the plurality of nodes; and for a data block of the plurality of data blocks, perform a dynamic data allocation including: receiving, from one or more nodes of the plurality of nodes on which that data block was stored in a prior time period, age data associated with an age of that data block in the distributed system; receiving, from each client of a number of clients that accessed that data block at the one or more nodes in the prior time period, network latency data associated with a network latency of that client for accessing that data block at the one or more nodes; generating, based on (i) the node health data, (ii) the age data, and (iii) the network latency data for each client of the number of clients that accessed that data block at the one or more nodes, a node assignment of a node of the plurality of nodes for that data block; determining, whether the node of the node assignment for that data block is different than a current node on which that data block is currently stored; and in response to determining that the node of the node assignment for that data block is different than the current node on which that data block is currently stored, moving that data block from the current node to the node of the node assignment.

Clause 16. The computer program product of clause 15, wherein the node health data associated with the plurality of read latencies associated with the plurality of nodes includes, for each node of the plurality of nodes, a read latency including an average amount of time taken by that node to serve one or more requests for access to one or more data blocks at that node.

Clause 17. The computer program product of clause 15 or clause 16, wherein the node health data further includes a plurality of load factors associated with the plurality of nodes, and wherein, for the data block of the plurality of data blocks: the network latency data further includes a priority of level of each client of the number of clients that accessed that data block at the one or more nodes, and generating the node assignment of the node of the plurality of nodes for that data block is further based on the plurality of load factors associated with the plurality of nodes and a priority of level of each client of the number of clients that accessed that data block at the one or more nodes.

Clause 18. The computer program product of any of clauses 15-17, wherein, for the data block of the plurality of data blocks, the age data associated with the age of that data block includes a number of clients that accessed that data block at the one or more nodes in the prior time period and a total number of times that that data block was accessed at the one or more nodes in the prior time period, and wherein the program instructions, when executed by the at least one processor, further cause the at least one processor to: for the data block of the plurality of data blocks: for each client of the number of clients that accessed that data block at the one or more nodes in the prior time period, determine, based on the network latency data associated with the network latency of that client for accessing that data block at the one or more nodes and the read latency of the one or more nodes, the network latency of that client for accessing that data block at the one or more nodes.

Clause 19. The computer program product of any of clauses 15-18, wherein, for the data block of the plurality of data blocks, generating the node assignment of the node of the plurality of nodes for that data block includes: providing, as input to a machine learning model, the (i) the plurality of read latencies associated with the plurality of nodes, (ii) the number of clients that accessed that data block at the one or more nodes in the prior time period, (iii) the total number of times that that data block was accessed at the one or more nodes in the prior time period, and (iv), for each client of the number of clients that accessed that data block at the one or more nodes, the network latency of that client for accessing that data block at the one or more nodes; and receiving, as output from the machine learning model, the node assignment of the node of the plurality of nodes for that data block.

Clause 20. The computer program product of any of clauses 15-19, wherein the program instructions, when executed by the at least one processor, further cause the at least one processor to: for each data block of the plurality of data blocks, continuously or periodically perform the dynamic data allocation.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
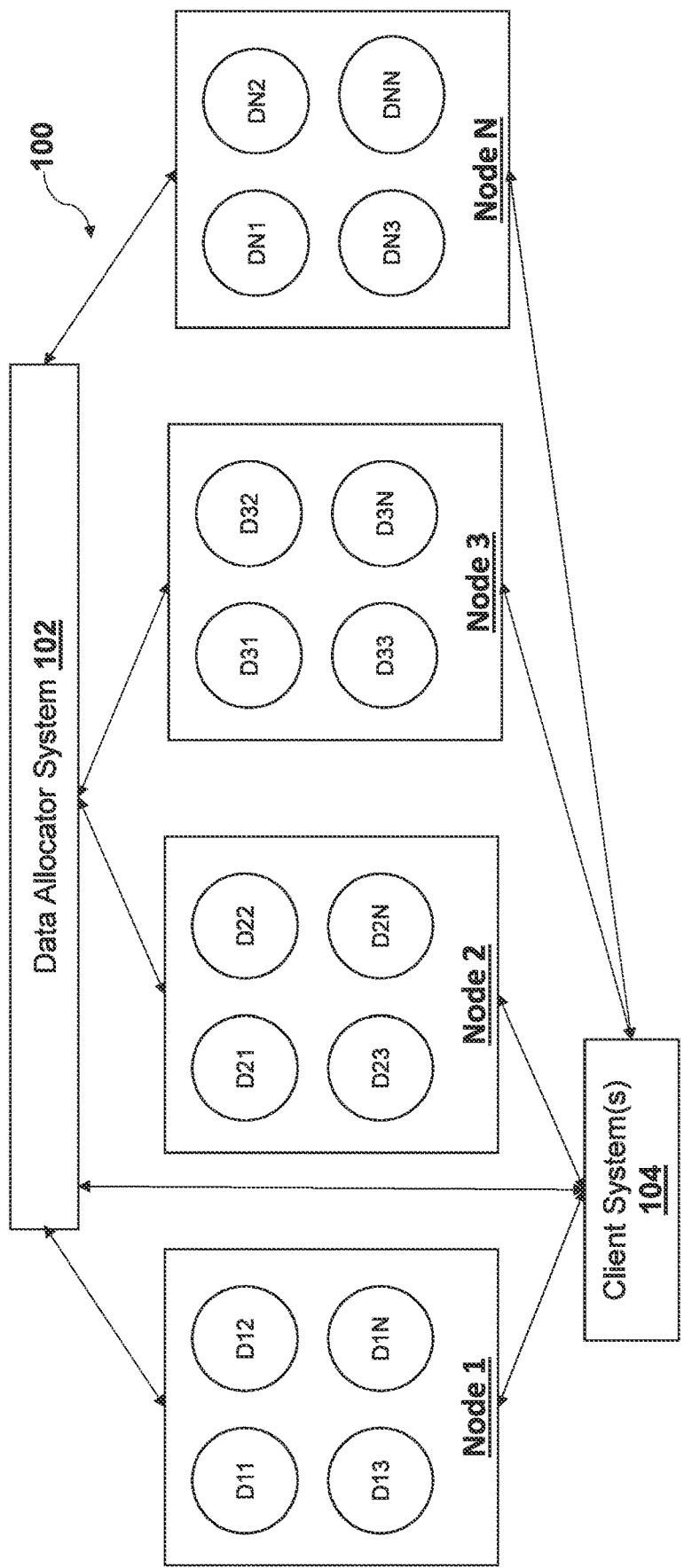
FIG. 1 is a schematic diagram of a system for dynamic data allocation to nodes in distributed systems, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

There are many existing efforts to solve a problem of data allocation/storage in a distributed system. These existing methods attempt to solve the problem when the data is first stored. However, in many cases, needs of clients that use the data change over time and an initial allocation/storage decision gradually becomes suboptimal. Moreover, as systems in a distributed cluster age, performance or health of the systems starts degrading, and due to the nature of distributed systems, this performance degradation may not be isolated or contained such that an efficiency of a complete or total workload that runs on the cluster is impacted.

Non-limiting embodiments or aspects of the present disclosure may provide methods, systems, and/or computer program products that store a plurality of data blocks at a plurality of nodes in a distributed system; receive, from the plurality of nodes, node health data associated with a plurality of read latencies associated with the plurality of nodes; and for a data block of the plurality of data blocks, perform a dynamic data allocation including: receiving, from one or more nodes of the plurality of nodes on which that data block was stored in a prior time period, age data associated with an age of that data block in the distributed system; receiving, from each client of a number of clients that accessed that data block at the one or more nodes in the prior time period, network latency data associated with a network latency of that client for accessing that data block at the one or more nodes; generating, based on (i) the node health data, (ii) the age data, and (iii) the network latency data for each client of the number of clients that accessed that data block at the one or more nodes, a node assignment of a node of the plurality of nodes for that data block; determining whether the node of the node assignment for that data block is different than a current node on which that data block is currently stored; and in response to determining that the node of the node assignment for that data block is different than the current node on which that data block is currently stored, moving that data block from the current node to the node of the node assignment.

In this way, non-limiting embodiments or aspects of the present disclosure may enable dynamic data allocation/movement of data blocks between nodes in a distributed cluster or system that automatically evolves based on needs of clients that access the data blocks, an overall efficiency of individual nodes in the cluster, and/or an impact of slower nodes on overall cluster operation, thereby improving utilization of the cluster overall. For example, a data allocator may connect with each of the nodes participating in the distributed system or cluster and gather information and/or data, such as a health of the nodes, an age of data stored on the nodes, and/or a network latency associated with client access of the data on the nodes. As an example, each client, after requesting data from a node, may create a connection with the data allocator to communicate the details of the data accessed and a time taken for the request to be completed for estimating a network latency involved in the request. Based on the health of the nodes, the age of data stored on the nodes, and/or the network latency associated with the client access of the data on the nodes, the data allocator may generate a node assignment (e.g., a node identifier, etc.) for each of the data blocks that are stored in the distributed system or cluster.

Referring now to FIG. 1, FIG. 1 is a schematic diagram of a system 100 for dynamic data allocation to nodes in distributed systems, according to some non-limiting embodiments or aspects. As shown in FIG. 1, system 100 may include data allocator system 102, a plurality of nodes Node 1, Node 2, Node 3, . . . Node N, and/or client system(s) 104. Data allocator system 102, the plurality of nodes Node 1, Node 2, Node 3, . . . Node N, and/or client system(s) 104 may interconnect (e.g., establish a connection to communicate, etc.) via wired connections, wireless connections, or a combination of wired and wireless connections.

Data allocator system 102 may include one or more devices capable of receiving information and/or data from the plurality of nodes Node 1, Node 2, Node 3, . . . Node N and/or client system(s) 104 (e.g., via a communication network, etc.) and/or communicating information and/or data to the plurality of nodes Node 1, Node 2, Node 3, . . .

Node N and/or client system(s) 104 (e.g., via a communication network, etc.). For example, data allocator system 102 may include a computing device, such as a server, a group of servers, and/or other like devices.

The plurality of nodes Node 1, Node 2, Node 3, . . . Node N may include one or more devices capable of receiving information and/or data from data allocator system 102 and/or client system(s) 104 (e.g., via a communication network, etc.) and/or communicating information and/or data to data allocator system 102 and/or client system(s) 104 (e.g., via a communication network, etc.). For example, the plurality of nodes Node 1, Node 2, Node 3, . . . Node N may be implemented in a distributed system in which individual nodes of the plurality of nodes Node 1, Node 2, Node 3, . . . Node N may be implemented within a single device and/or system or distributed across multiple devices and/or systems of the distributed system. For example, a node of the plurality of nodes Node 1, Node 2, Node 3, . . . Node N may include and/or be implemented by a computing device, such as a server, a group of servers, and/or other like devices. As an example, one or more nodes of the plurality of nodes Node 1, Node 2, Node 3, . . . Node N (e.g., one or more computing devices that implements or is included in the one or more nodes of the plurality of nodes Node 1, Node 2, Node 3, . . . Node N, etc.) may be located at a different physical location than one or more other nodes of the plurality of nodes Node 1, Node 2, Node 3, . . . Node N (e.g., one or more other computing devices that implements or is included in the one or more other nodes of the plurality of nodes Node 1, Node 2, Node 3, . . . Node N, etc.).

In some non-limiting embodiments or aspects, the plurality of nodes Node 1, Node 2, Node 3, . . . Node N includes a plurality of heterogeneous nodes. For example, different nodes of the plurality of nodes Node 1, Node 2, Node 3, . . . Node N may include different types of hardware, firmware, or a combination of hardware and software (e.g., different types and/or speeds of random access memory (RAM), different types and/or speeds of processors, etc.).

Client system(s) 104 may include one or more devices capable of receiving information and/or data from data allocator system 102 and/or the plurality of nodes Node 1, Node 2, Node 3, . . . Node N (e.g., via a communication network, etc.) and/or communicating information and/or data to data allocator system 102 and/or the plurality of nodes Node 1, Node 2, Node 3, . . . Node N (e.g., via a communication network, etc.). For example, client system 104 may include a computing device, such as a server, a group of servers, and/or other like devices.

The plurality of nodes Node 1, Node 2, Node 3, . . . Node N may be configured to store a plurality of data blocks. For example, data allocator system 102 may be configured to store the plurality of data blocks at the plurality of nodes Node 1, Node 2, Node 3, . . . Node N. As an example, as shown in FIG. 1, example data blocks D11, D12, D13, . . . D1N may be stored (e.g., initially stored, currently stored, etc.) at Node 1, example data blocks D21, D22, D23, . . . D2N may be stored (e.g., initially stored, currently stored, etc.) at Node 2, example data blocks D31, D32, D33, . . . D3N may be stored (e.g., initially stored, currently stored, etc.) at Node 3, and/or example data blocks DN1, DN2, DN3, . . . DNN may be stored (e.g., initially stored, currently stored, etc.) at Node N. Client system(s) 104 may be configured to access the plurality of data blocks at the plurality of nodes Node 1, Node 2, Node 3, . . . Node N. The plurality of nodes Node 1, Node 2, Node 3, . . . Node N may be configured to enable or allow a plurality of different clients or client systems 104 to access requested data blocks of the plurality of data blocks. In such an example, one or more clients or client systems 104 (e.g., one or more computing devices of the one or more clients or client systems 104, etc.) may be located at a different physical location than one or more other clients or client systems 104 (e.g., one or more other computing devices of the one or more other clients or client systems 104, etc.). In some non-limiting embodiments or aspects, data access patterns of clients may be assumed to be uniform at some frequency.

A data block may include a sequence of bits or bytes, which may contain some whole number of records, having a maximum length (e.g., a block size, etc.). For example, a data block may include a sequence of data in bits or bytes that may be transferred as a whole. The plurality of data blocks may include a plurality of different types of data. In some non-limiting embodiments or aspects, the plurality of data blocks may include transaction data associated with a plurality of transactions processed in an electronic payment network. For example, transaction data may include parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, a transaction approval (and/or decline) rate, and/or the like.

Figure 3:
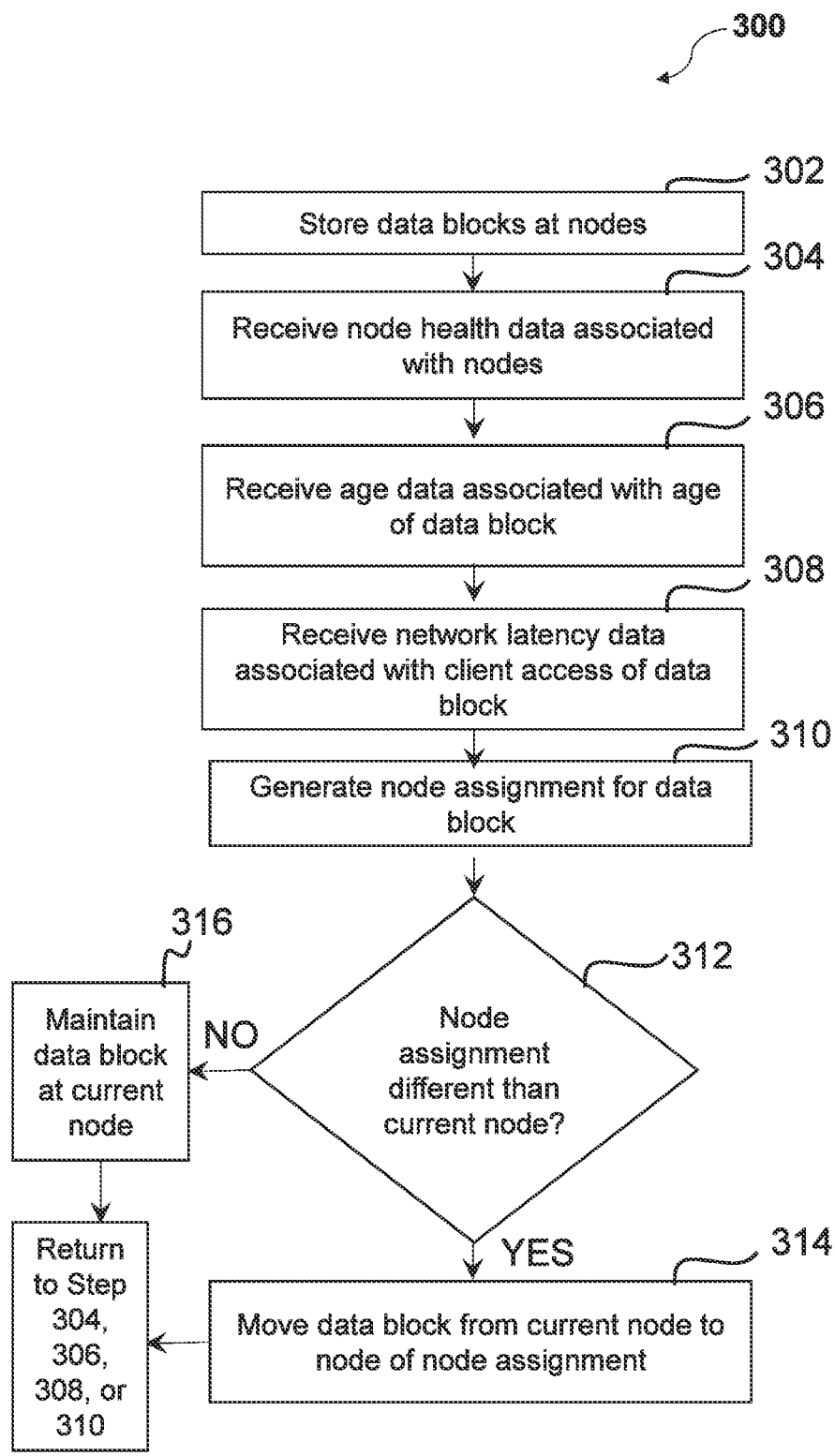
FIG. 3 is a flow diagram of a method for dynamic data allocation to nodes in distributed systems, according to some non-limiting embodiments or aspects.

As described herein in more detail with respect to FIG. 3, data allocator system 102 may be configured to generate, for a data block of the plurality of data blocks (e.g., for each data of the plurality of data blocks, etc.), based on information and/or data received from the plurality of nodes Node 1, Node 2, Node 3, . . . Node N and/or client system(s) 104, a node assignment of a node of the plurality of nodes Node 1, Node 2, Node 3, . . . Node N for that data block. Data allocator system 102 may be configured to determine, whether the node of the node assignment is different than a current node on which that data block is currently stored and/or, in response to determining that the node of the node assignment is different than the current node on which that data block is currently stored, move that data block from the current node to the node of the node assignment. For example, data allocator system 102 may be configured to move a data block stored on a node (e.g., Node 3, etc.) to another node (e.g., Node 1, etc.). As an example, data allocator system 102 may be configured to remove from or delete the data block stored on the node (e.g., Node 3, etc.) and store the data block on another node (e.g., Node 1, etc.).

A communication network may include one or more wired and/or wireless networks. For example, a communication network may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Figure 2:
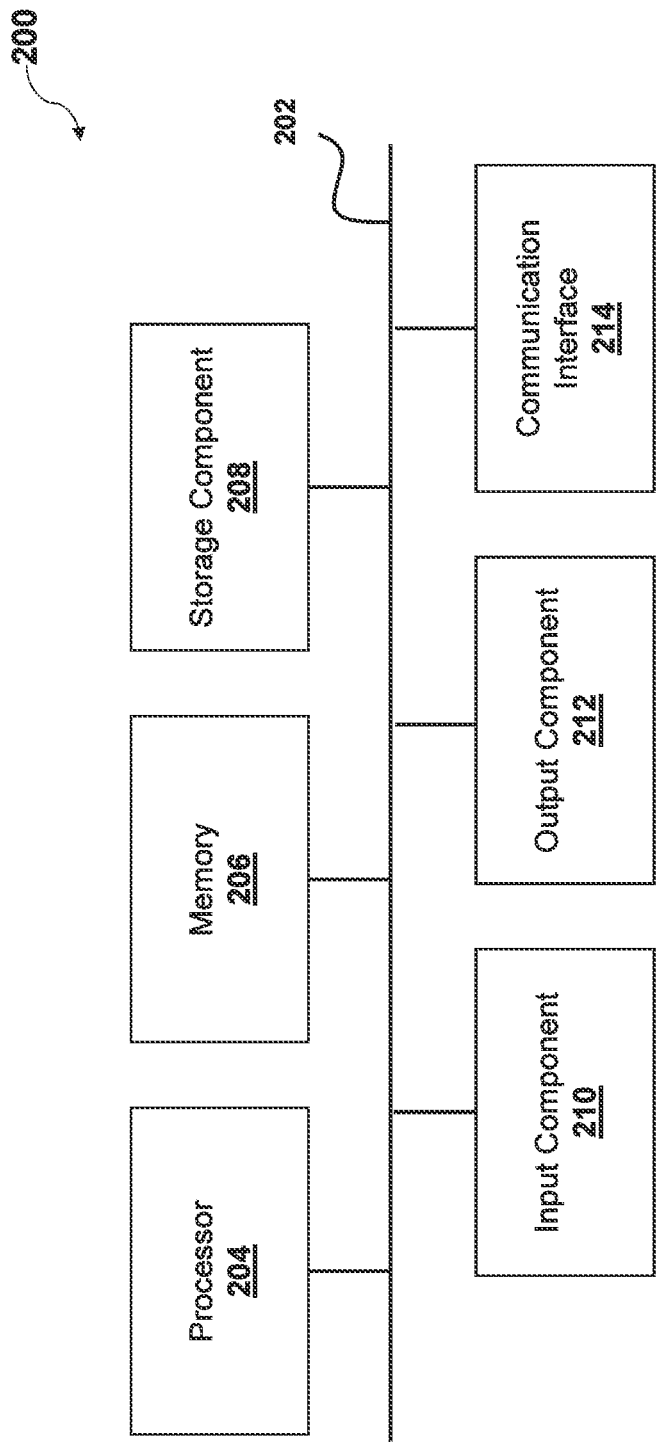
FIG. 2 is a schematic diagram of example components of one or more devices of FIG. 1, according to some non-limiting embodiments or aspects.

Referring now to FIG. 2, shown is a diagram of example components of a device 200 according to non-limiting embodiments. Device 200 may correspond to data allocator system 102, one or more nodes of the plurality of nodes Node 1, Node 2, Node 3, . . . Node N, and/or client system(s) 104, as an example. In some non-limiting embodiments, such systems or devices may include at least one device 200 and/or at least one component of device 200. The number and arrangement of components shown are provided as an example. In some non-limiting embodiments, device 200 may include additional components, fewer components, different components, or differently arranged components than those shown. Additionally, or alternatively, a set of components (e.g., one or more components) of device 200 may perform one or more functions described as being performed by another set of components of device 200.

As shown in FIG. 2, device 200 may include a bus 202, a processor 204, memory 206, a storage component 208, an input component 210, an output component 212, and a communication interface 214. Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid-state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed to" or "configured to," as used herein, may refer to an arrangement of software, device(s), and/or hardware for performing and/or enabling one or more functions (e.g., actions, processes, steps of a process, and/or the like). For example, "a processor configured to" or "programmed to" may refer to a processor that executes software instructions (e.g., program code) that cause the processor to perform one or more functions.

Referring now to FIG. 3, shown is a flow diagram for a method 300 for dynamic data allocation to nodes in distributed systems, according to some non-limiting embodiments or aspects. The steps shown in FIG. 3 are for example purposes only. It will be appreciated that additional, fewer, different, and/or a different order of steps may be used in some non-limiting embodiments or aspects. In some non-limiting embodiments or aspects, a step may be automatically performed in response to performance and/or completion of a prior step.

As shown in FIG. 3, at step 302, method 300 includes storing a plurality of data blocks at a plurality of nodes. For example, data allocator system 102 may store a plurality of data blocks at the plurality of nodes Node 1, Node 2, Node 3, . . . Node N in a distributed system. As an example, the plurality of nodes Node 1, Node 2, Node 3, . . . Node N may store the plurality of data blocks. In such an example, the plurality of data blocks may be stored (e.g., initially stored, currently stored, etc.) at the plurality of nodes Node 1, Node 2, Node 3, . . . Node N.

As shown in FIG. 3, at step 304, method 300 includes receiving node health data associated with a plurality of read latencies associated with a plurality of nodes. For example, data allocator system 102 may receive node health data associated with a plurality of read latencies associated with the plurality of nodes Node 1, Node 2, Node 3, . . . Node N. As an example, data allocator system 102 may receive, from the plurality of nodes Node 1, Node 2, Node 3, . . . Node N, node health data associated with a plurality of read latencies associated with the plurality of nodes Node 1, Node 2, Node 3, . . . Node N.

Node health data may include and/or data allocator system 102 may determine, based on node health data, a read latency including a delay (e.g., an amount of time, etc.) introduced or taken by a node in serving of a request for access to a data block at that node (e.g., an amount of time used by the node to serve the request, an amount of time taken due to node processing, etc.). For example, node health data may include and/or data allocator system 102 may determine, based on node health data, an average read latency including an average delay (e.g., an average amount of time, etc.) introduced or taken by a node to serve of one or more requests for access to one or more data blocks at that node (e.g., an average amount of time used by the node to serve a plurality of requests from one or more clients, an average amount of time taken due to node processing, etc.). As an example, the node health data associated with the plurality of read latencies associated with the plurality of nodes Node 1, Node 2, Node 3, . . . Node N may include, for each node of the plurality of nodes Node 1, Node 2, Node 3, . . . Node N, a read latency including an average amount of time taken by that node to serve one or more requests for access to one or more data blocks at that node.

In some non-limiting embodiments or aspects, node health data may further include a plurality of load factors associated with the plurality of nodes. For example, a load factor of a node may include a ratio of a number of data blocks stored at the node to a number of addresses (e.g., a number of storage blocks, a number of memory locations, etc.) within the node. As an example, if each client is collocated and accesses a same or similar type of data, data allocator 102 may attempt to place more data on a select few nodes while using the remainder of the nodes for storing much less or no data. In such an example, the plurality of load factors may be used as a forced override to indicate to data allocator system 102 (e.g., to a data allocation algorithm or model of data allocator system 102, etc.) to take into account load factors of individual nodes to avoid placing data that causes the individual nodes to violate a certain load threshold.

A health of a node on which a data block is stored and/or may be potentially stored may play a role in determining utilization of a cluster. For example, because of a nature of distributed systems, a node that is active (e.g., live, etc.) but is performing sub-optimally may potentially hamper a performance of an entire system workload and/or become a bottle neck. As an example, as hardware systems of nodes age, a maximum clock speed of processors thereof may be reduced, magnetic discs thereof may have sector failures, and/or the like. Accordingly, it may be advantageous to asses a health of a node before data allocation/storage, because an allocation of fresh, high access data on a node that is not able to perform to a sufficient or maximum capacity may be undesirable, but such nodes may be suitable for older, less accessed data. For example, non-limiting embodiments or aspects of the present disclosure may systemically reduce a dependency of a distributed system or cluster on unhealthy/older nodes by using the unhealthy/older nodes more for archival purpose and moving more frequently accessed data to healthy/faster nodes.

As shown in FIG. 3, at step 306, method 300 includes receiving age data associated with an age of a data block. For example, data allocator system 102 may receive age data associated with an age of a data block in a distributed system. As an example, for a data block of the plurality of data blocks (e.g., for each data block of the plurality of data blocks, etc.), data allocator system 102 may receive, from one or more nodes of the plurality of nodes Node 1, Node 2, Node 3, . . . Node N on which that data block was stored in a prior time period, age data associated with an age of that data block in the distributed system.

In some non-limiting embodiments or aspects, for a data block of the plurality of data blocks (e.g., for each data block of the plurality of data blocks, etc.), the age data associated with the age of that data block includes a number of clients that accessed that data block at the one or more nodes in the prior time period, a total number of times that that data block was accessed at the one or more nodes in the prior time period (e.g., a number of times that that data block was accessed globally, etc.), an amount of time since that data block was first stored or persisted at a node of the plurality of nodes Node 1, Node 2, Node 3, . . . Node N in the distributed system, or any combination thereof.

In some non-limiting embodiments or aspects, the plurality of data blocks may be divided into generations according to ages of the plurality of data blocks. For example, a node or group of nodes of the plurality of nodes Node 1, Node 2, Node 3, . . . Node N may be designated or given priority to store a particular generation of data blocks.

An age of a data block may be associated with how frequently that data block is expected to be used. For example, more recent data may be more frequently accessed as compared to data that is old. In this way, an age of a data block may be relevant to an allocation/storage decision, because it may be advantageous to place fresher data on nodes that have a higher or maximum compute capacity and/or provide a lower or minimum access latency to clients, and as the data block ages, it may be advantageous to move the now less fresh data to other (e.g., slower, etc.) nodes to make room for more fresh data on faster nodes. For example, as an age of a distributed system and/or nodes thereof increases, it may be advantageous to sweep out data that is fresher and/or more frequently accessed from the older nodes and sweep in data to those older nodes that is more stale and/or less frequently accessed.

As shown in FIG. 3, at step 308, method 300 includes receiving network latency data associated with one or more clients accessing a data block. For example, data allocator system 102 may receive network latency data associated with one or more clients (e.g., one or more client systems 104, etc.) accessing a data block. As an example, for a data block of the plurality of data blocks (e.g., for each data block of the plurality of data blocks, etc.), data allocator system 102 may receive, from each client of a number of clients that accessed that data block at the one or more nodes in the prior time period, network latency data associated with a network latency of that client for accessing that data block at the one or more nodes. In such an example, after a request to access a data block at a node of the plurality of nodes Node 1, Node 2, Node 3, . . . Node N is completed (e.g., after accessing the data block at the node, etc.), client system 104 may automatically communicate, to data allocator system 102, network latency data including information and/or data associated with the accessed data block (e.g., an identifier associated with the data block, etc.) and/or the node on which the data block is stored (e.g., an identifier associated with the node, etc.) and/or an amount of time taken to provide the access to that client for that data block at the node (e.g., an amount of time taken for the request to be completed, etc.).

Network latency data may include and/or data allocator system 102 may determine, based on network latency data, a network latency including a delay (e.g., an amount of time, etc.) introduced or taken in serving of a request of a client for access to a data block at a node due to network communication. For example, network latency data may include and/or data allocator system 102 may determine, based on network latency data, an average network latency including an average delay (e.g., an average amount of time, etc.) introduced or taken in serving of one or more requests for access to a data block at a node due to network communication. As an example, a network latency may be equal to a total latency (e.g., a total amount of time taken for a client to access a data block at a node, etc.) minus a read latency of the node (e.g., an amount of time used by the node to serve the request, an amount of time taken due to node processing, etc.). In such an example, for a data block of the plurality of data blocks (e.g., for each data block of the plurality of data blocks, etc.), data allocator system 102 may, for each client of the number of clients that accessed that data block at the one or more nodes in the prior time period, determine, based on the network latency data associated with the network latency of that client for accessing that data block at the one or more nodes and the read latency of the one or more nodes, the network latency of that client for accessing that data block at the one or more nodes.

In some non-limiting embodiments or aspects, for the data block of the plurality of data blocks, the network latency data further includes a priority of level of each client of the number of clients that accessed that data block at the one or more nodes. For example, one or more clients or client systems 104 (e.g., one or more computing devices of the one or more clients or client systems 104, etc.) may be associated with a different priority level than one or more other clients or client systems 104 (e.g., one or more other computing devices of the one or more other clients or client systems 104, etc.). As an example, network latency data (e.g., a network latency associated therewith, etc.) associated with a client that has a higher priority level may be weighted more heavily for generating a node assignment as described herein than network latency data (e.g., a network latency associated therewith, etc.) associated with a client that has a lower priority level.

Network latency may be higher for requests that have to travel a longer distance. Accordingly, it may be advantageous to place data physically closer to the clients that are more likely to access that data. However, because there may be different clients accessing the same data from different locations, calculation of allocation/storage to reduce or minimize latency may become non-trivial, but not intractable. For example, an allocation of fresh or frequently accessed data on a higher performing node that is located far from a client may perform worse than an allocation of that data on a lower performing node located closer to the client. As an example, an allocation of fresh or frequently accessed data on a higher performing node that is located marginally farther from a client than a lower performing node located marginally closer to the client may perform better than an allocation of that data on the lower performing node located closer to the client. Further, in scenarios where a client that accesses data with high frequency relocates to a different physical location relative to locations of the plurality of nodes Node 1, Node 2, Node 3, . . . Node N, it may be advantageous for data allocator system 102 to use an updated network latency of the client associated with the different physical location to generate updated node assignments that help maintain a same or similar access time of the data for the client now at the different physical location.

As we can observe in the scenario above, when the client moved from one location at time t1 to another location at time t2, the data allocator takes cognizance of that and relocates the data to a node which is closer to the new location of the client i.e., Node 3.

As shown in FIG. 3, at step 310, method 300 includes generating a node assignment for a data block. For example, data allocator system 102 may generate a node assignment of a node of the plurality of nodes Node 1, Node 2, Node 3, . . . Node N for a data block. As an example, for a data block of the plurality of data blocks (e.g., for each data block of the plurality of data blocks, etc.), data allocator system 102 may generate, based on (i) the node health data, (ii) the age data, and/or (iii) the network latency data for each client of the number of clients that accessed that data block at the one or more nodes, a node assignment of a node of the plurality of nodes for that data block.

In some non-limiting embodiments or aspects, for a data block of the plurality of data blocks (e.g., for each data block of the plurality of data blocks, etc.), data allocator system 102 may generate the node assignment of the node of the plurality of nodes for that data block by providing, as input to a machine learning model, (i) the plurality of read latencies associated with the plurality of nodes, (ii) the number of clients that accessed that data block at the one or more nodes in the prior time period, (iii) the total number of times that that data block was accessed at the one or more nodes in the prior time period, (iv) for each client of the number of clients that accessed that data block at the one or more nodes, the network latency of that client for accessing that data block at the one or more nodes, (v) the plurality of load factors associated with the plurality of nodes, (vi) a priority of level of each client of the number of clients that accessed that data block at the one or more nodes, any combination thereof, and/or the like; and receiving, as output from the machine learning model, the node assignment of the node of the plurality of nodes for that data block.

In some non-limiting embodiments or aspects, the machine learning model may include a reinforcement learning model with feedback. For example, data allocator system 102 may generate a node assignment of a node of the plurality of nodes for a data block (e.g., for each data block, etc.) based on a reinforcement learning technique. As an example, data allocator system 102 may generate a machine learning model (e.g., a prediction model, a feedforward neural network, a feedback neural network, etc.) based on a reinforcement learning algorithm. For example, data allocator system 102 may generate the machine learning model based on (i) the node health data, (ii) the age data, and/or (iii) the network latency data. In such an example, the machine learning model may be designed to receive, as input, (i) a plurality of read latencies associated with the plurality of nodes Node 1, Node 2, Node 3, . . . Node N, (ii) a number of clients that accessed a data block at one or more nodes in a prior time period, (iii) a total number of times that that data block was accessed at the one or more nodes in the prior time period, (iv) for each client of the number of clients that accessed that data block at the one or more nodes, a network latency of that client for accessing that data block at the one or more nodes, (v) a plurality of load factors associated with the plurality of nodes Node 1, Node 2, Node 3, . . . Node N, (vi) a priority of level of each client of the number of clients that accessed that data block at the one or more nodes, any combination thereof, and/or the like, and provide, as output, a node assignment of a node of the plurality of nodes for the data block (e.g., a one hot encoding identifying the node of the plurality of nodes assigned to the data block, etc.). For example, for a five node cluster, a node assignment of a first node of the five node cluster for a data block may include the following array [1, 0, 0, 0, 0] indicating that the data block should be stored on the first node of the five nodes in the cluster or distributed system.

Data allocator system 102 may store the machine learning model (e.g., store the model for use, etc.). Data allocator system 102 may store the machine learning model in a data structure (e.g., a database, a memory, etc.). As an example, the data structure may be located within data allocator system 102 or external to (e.g., remote from, etc.) data allocator system 102. In such an example, data allocator system 102 may generate a node assignment using the machine learning model.

In this way, the use of a reinforcement learning model or algorithm, which based on feedback (e.g., the cluster utilization, the node health data, the age data, the network latency data, etc.), can dynamically change a data allocation and/or continuously evolve the data allocation may provide for better utilization of a cluster (e.g., for better utilization of the plurality of nodes Node 1, Node 2, Node 3, . . . Node N, etc.).

As shown in FIG. 3, at step 312, method 300 includes determining whether a node assignment for a data block is different than a current node on which the data block is currently stored. For example, data allocator system 102 may determine whether a node assignment for a data block is different than a current node on which the data block is currently stored. As an example, for a data block of the plurality of data blocks (e.g., for each data block of the plurality of data blocks, etc.), data allocator system 102 may determine whether the node of the node assignment for that data block is different than a current node on which that data block is currently stored.

Figure 4:
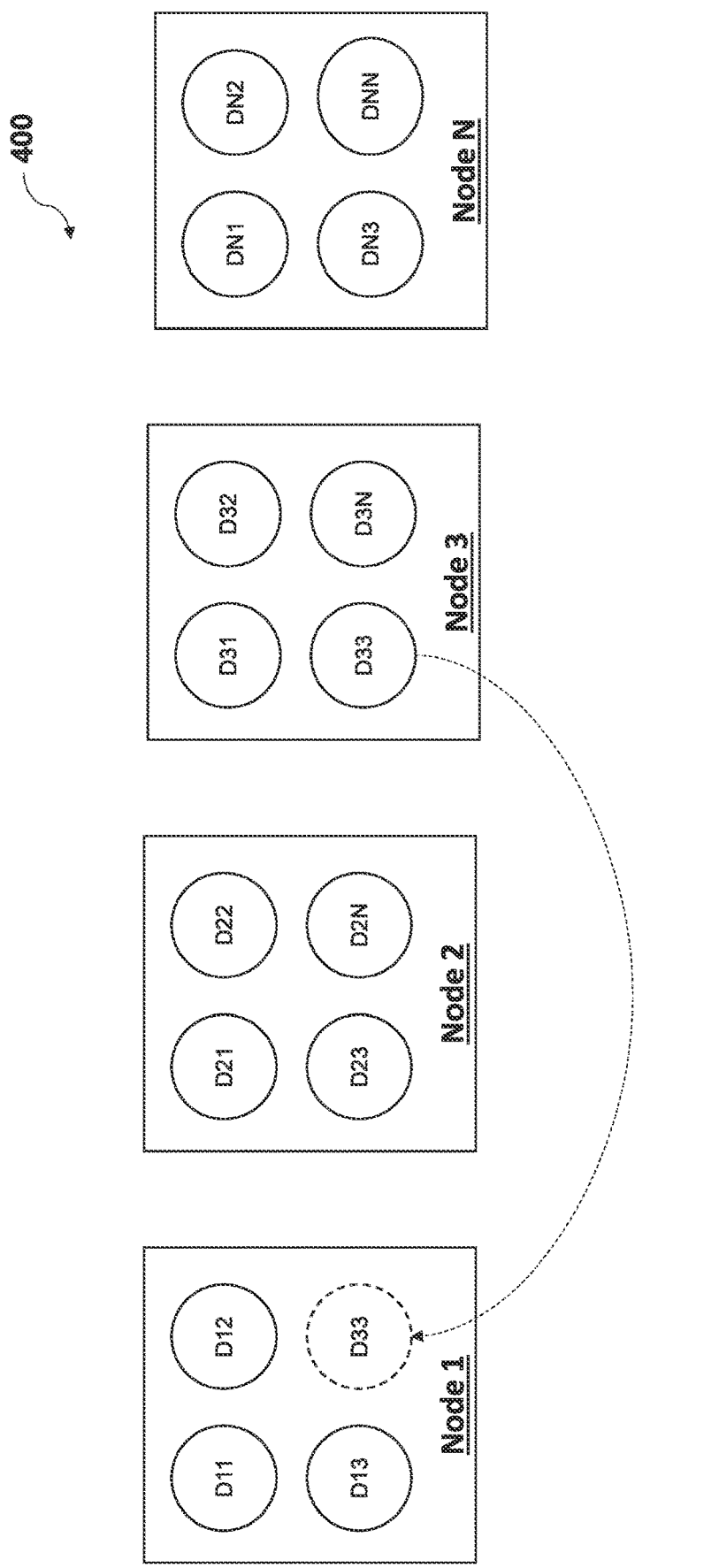
FIG. 4 is a schematic diagram illustrating an example movement of a data block from a current node to a node of a node assignment, according to some non-limiting embodiments or aspects.

As shown in FIG. 3, at step 314, method 300 includes, in response to determining that a node of a node assignment is different than a current node on which a data block is currently stored, moving the data block from the current node to the node of the node assignment. For example, data allocator system 102 may, in response to determining that a node of a node assignment is different than a current node on which a data block is currently stored, move the data block from the current node to the node of the node assignment. As an example, for a data block of the plurality of data blocks (e.g., for each data block of the plurality of data blocks, etc.), data allocator system 102 may, in response to determining that the node of the node assignment for that data block is different than the current node on which that data block is currently stored, move that data block from the current node to the node of the node assignment. As an example, and referring also to FIG. 4, which is a schematic diagram illustrating an example movement 400 of a data block from a current node to a node of a node assignment, data allocator system 102 may remove from or delete a data block (e.g., D33, etc.) stored on a current node (e.g., Node 3, etc.) and store the data block (e.g., D33, etc.) on the node of the node assignment (e.g., Node 1, etc.). In such an example, after moving that data block from the current node to the node of the node assignment, processing may return to step 304, 306, 308, or 310 of method 300 such that data allocator system 102 may receive feedback from the plurality of nodes Node 1, Node 2, Node 3, . . . Node N and/or client system(s) 104 and/or dynamically update the data allocation based on received feedback.

As shown in FIG. 3, at step 316, method 300 includes, in response to determining that a node of a node assignment is a same node as a current node on which a data block is currently stored, maintaining the data block at the current node. For example, data allocator system 102 may, in response to determining that a node of a node assignment is a same node as a current node on which a data block is currently stored, maintain the data block at the current node. As an example, for a data block of the plurality of data blocks (e.g., for each data block of the plurality of data blocks, etc.), data allocator system 102 may, in response to determining that the node of the node assignment for that data block is a same node as the current node on which that data block is currently stored, maintain that data block at the current node. In such an example, after maintaining that data block at the current node, processing may return to step 304, 306, 308, or 310 of method 300 such that data allocator system 102 may receive feedback from the plurality of nodes Node 1, Node 2, Node 3, . . . Node N and/or client system(s) 104 and/or dynamically update the data allocation based on received feedback.

In some non-limiting embodiment or aspects, for a data block of the plurality of data blocks (e.g., for each data block of the plurality of data blocks, etc.), data allocator system 102 may continuously or periodically perform a data allocation that includes one or more of steps 304-316 of method 300. For example, data allocator system 102 may (i) continuously or periodically receive, from the plurality of nodes Node 1, Node 2, Node 3, . . . Node N, updated node health data associated with the plurality of read latencies associated with the plurality of nodes Node 1, Node 2, Node 3, . . . Node N, (ii) continuously or periodically receive, from the one or more nodes of the plurality of nodes Node 1, Node 2, Node 3, . . . Node N on which a data block was stored in a prior time period, updated age data associated with the age of that data block in the distributed system, (iii) continuously or periodically receive, from each client of the number of clients that accessed a data block at the one or more nodes in the prior time period, updated network latency data associated with the network latency of that client for accessing that data block at the one or more nodes, or any combination thereof. As an example, in response to receiving the updated node health data, the updated age data, the updated network latency data, or any combination thereof, data allocator system 102 may continuously or periodically perform a data allocation that includes generating, based on the updated node health data, the updated age data, the updated network latency data, or any combination thereof, a node assignment of a node of the plurality of nodes for a data block (e.g., a node assignment of a node for each data block, etc.).

In such an example, after the plurality of data blocks is assigned to and stored on the plurality of nodes Node 1, Node 2, Node 3, . . . Node N (e.g., after the plurality of data blocks is initially assigned to and stored on the plurality of nodes Node 1, Node 2, Node 3, . . . Node N, after the plurality of data blocks is assigned to and stored on the plurality of nodes Node 1, Node 2, Node 3, . . . Node N in a current data allocation/storage configuration, etc.), feedback from the plurality of nodes Node 1, Node 2, Node 3, . . . Node N and/or client system(s) 104 to data allocator system 102 may be received in a continuous manner, in a periodic manner, and/or in response to client access of the stored data, and data allocator system 102 may generate, based on the feedback, an updated or new node assignment of a new or updated node for a data block (e.g., for each data block, etc.).

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method, comprising:
   storing, with at least one processor, a plurality of data blocks at a plurality of nodes in a distributed system;

receiving, with the at least one processor, from the plurality of nodes, node health data associated with a plurality of read latencies associated with the plurality of nodes; and for a data block of the plurality of data blocks, performing, with the at least one processor, a dynamic data allocation including:

receiving, from one or more nodes of the plurality of nodes on which that data block was stored in a prior time period, age data associated with an age of that data block in the distributed system;

receiving, from each client of a number of clients that accessed that data block at the one or more nodes in the prior time period, network latency data associated with a network latency of that client for accessing that data block at the one or more nodes;

generating, based on (i) the node health data, (ii) the age data, and (iii) the network latency data for each client of the number of clients that accessed that data block at the one or more nodes, a node assignment of a node of the plurality of nodes for that data block;

determining whether the node of the node assignment for that data block is different than a current node on which that data block is currently stored; and in response to determining that the node of the node assignment for that data block is different than the current node on which that data block is currently stored, moving that data block from the current node to the node of the node assignment, wherein the node health data associated with the plurality of read latencies associated with the plurality of nodes includes, for each node of the plurality of nodes, a read latency including an average amount of time taken by that node to serve one or more requests for access to one or more data blocks at that node, wherein the node health data further includes a plurality of load factors associated with the plurality of nodes, and wherein, for the data block of the plurality of data blocks:

the network latency data further includes a priority of level of each client of the number of clients that accessed that data block at the one or more nodes, and generating the node assignment of the node of the plurality of nodes for that data block is further based on the plurality of load factors associated with the plurality of nodes and a priority of level of each client of the number of clients that accessed that data block at the one or more nodes.

2. The method of claim 1, wherein, for the data block of the plurality of data blocks, the age data associated with the age of that data block includes a number of clients that accessed that data block at the one or more nodes in the prior time period and a total number of times that that data block was accessed at the one or more nodes in the prior time period.

3. The method of claim 2, further comprising:

for the data block of the plurality of data blocks, with the at least one processor:

for each client of the number of clients that accessed that data block at the one or more nodes in the prior time period, determining, based on the network latency data associated with the network latency of that client for accessing that data block at the one or more nodes and the read latency of the one or more nodes, the network latency of that client for accessing that data block at the one or more nodes.

4. The method of claim 3, wherein, for the data block of the plurality of data blocks, generating the node assignment of the node of the plurality of nodes for that data block includes:

providing, as input to a machine learning model, the (i) the plurality of read latencies associated with the plurality of nodes, (ii) the number of clients that accessed that data block at the one or more nodes in the prior time period, (iii) the total number of times that that data block was accessed at the one or more nodes in the prior time period, and (iv), for each client of the number of clients that accessed that data block at the one or more nodes, the network latency of that client for accessing that data block at the one or more nodes; and receiving, as output from the machine learning model, the node assignment of the node of the plurality of nodes for that data block.

5. The method of claim 1, further comprising:

for each data block of the plurality of data blocks, continuously or periodically performing, with the at least one processor, the dynamic data allocation.

6. A system, comprising:

at least one processor coupled to a memory and configured to:

store a plurality of data blocks at a plurality of nodes in a distributed system;

receive, from the plurality of nodes, node health data associated with a plurality of read latencies associated with the plurality of nodes; and for a data block of the plurality of data blocks, perform a dynamic data allocation including:

receiving, from one or more nodes of the plurality of nodes on which that data block was stored in a prior time period, age data associated with an age of that data block in the distributed system;

receiving, from each client of a number of clients that accessed that data block at the one or more nodes in the prior time period, network latency data associated with a network latency of that client for accessing that data block at the one or more nodes;

generating, based on (i) the node health data, (ii) the age data, and (iii) the network latency data for each client of the number of clients that accessed that data block at the one or more nodes, a node assignment of a node of the plurality of nodes for that data block;

determining, whether the node of the node assignment for that data block is different than a current node on which that data block is currently stored; and in response to determining that the node of the node assignment for that data block is different than the current node on which that data block is currently stored, moving that data block from the current node to the node of the node assignment, wherein the node health data associated with the plurality of read latencies associated with the plurality of nodes includes, for each node of the plurality of nodes, a read latency including an average amount of time taken by that node to serve one or more requests for access to one or more data blocks at that node, wherein the node health data further includes a plurality of load factors associated with the plurality of nodes, and wherein, for the data block of the plurality of data blocks:
the network latency data further includes a priority of level of each client of the number of clients that accessed that data block at the one or more nodes, and
generating the node assignment of the node of the plurality of nodes for that data block is further based on the plurality of load factors associated with the plurality of nodes and a priority of level of each client of the number of clients that accessed that data block at the one or more nodes.

7. The system of claim 6, wherein, for the data block of the plurality of data blocks, the age data associated with the age of thatdata block includes a number of clients that accessed that data block at the one or more nodes in the prior time period and a total number of times that that data block was accessed at the one or more nodes in the prior time period.

8. The system of claim 7, wherein the at least one processor is further configured to:
for the data block of the plurality of data blocks:
for each client of the number of clients that accessed that data block at the one or more nodes in the prior time period, determine, based on the network latency data associated with the network latency of that client for accessing that data block at the one or more nodes and the read latency of the one or more nodes, the network latency of that client for accessing that data block at the one or more nodes.

9. The system of claim 8, wherein, for the data block of the plurality of data blocks, generating the node assignment of the node of the plurality of nodes for that data block includes:
providing, as input to a machine learning model, the (i) the plurality of read latencies associated with the plurality of nodes, (ii) the number of clients that accessed that data block at the one or more nodes in the prior time period, (iii) the total number of times that that data block was accessed at the one or more nodes in the prior time period, and (iv), for each client of the number of clients that accessed that data block at the one or more nodes, the network latency of that client for accessing that data block at the one or more nodes; and
receiving, as output from the machine learning model, the node assignment of the node of the plurality of nodes for that data block.

10. The system of claim 6, wherein the at least one processor is further configured to:
for each data block of the plurality of data blocks, continuously or periodically perform the dynamic data allocation.

11. A computer program product comprising at least one non-transitory computer-readable medium including program instructions that, when executed by at least one processor of a node of a plurality of nodes, cause the at least one processor to:
store a plurality of data blocks at a plurality of nodes in a distributed system;
receive, from the plurality of nodes, node health data associated with a plurality of read latencies associated with the plurality of nodes; and
for a data block of the plurality of data blocks, perform a dynamic data allocation including:
receiving, from one or more nodes of the plurality of nodes on which that data block was stored in a prior time period, age data associated with an age of that data block in the distributed system;
receiving, from each client of a number of clients that accessed that data block at the one or more nodes in the prior time period, network latency data associated with a network latency of that client for accessing that data block at the one or more nodes;
generating, based on (i) the node health data, (ii) the age data, and (iii) the network latency data for each client of the number of clients that accessed that data block at the one or more nodes, a node assignment of a node of the plurality of nodes for that data block;
determining, whether the node of the node assignment for that data block is different than a current node on which that data block is currently stored; and
in response to determining that the node of the node assignment for that data block is different than the current node on which that data block is currently stored, moving that data block from the current node to the node of the node assignment,
wherein the node health data associated with the plurality of read latencies associated with the plurality of nodes includes, for each node of the plurality of nodes, a read latency including an average amount of time taken by that node to serve one or more requests for access to one or more data blocks at that node,
wherein the node health data further includes a plurality of load factors associated with the plurality of nodes, and
wherein, for the data block of the plurality of data blocks:
the network latency data further includes a priority of level of each client of the number of clients that accessed that data block at the one or more nodes, and
generating the node assignment of the node of the plurality of nodes for that data block is further based on the plurality of load factors associated with the plurality of nodes and a priority of level of each client of the number of clients that accessed that data block at the one or more nodes.

12. The computer program product of claim 11, wherein, for the data block of the plurality of data blocks, the age data associated with the age of that data block includes a number of clients that accessed that data block at the one or more nodes in the prior time period and a total number of times that that data block was accessed at the one or more nodes in the prior time period, and
wherein the program instructions, when executed by the at least one processor, further cause the at least one processor to:
for the data block of the plurality of data blocks:
for each client of the number of clients that accessed that data block at the one or more nodes in the prior time period, determine, based on the network latency data associated with the network latency of that client for accessing that data block at the one or more nodes and the read latency of the one or more nodes, the network latency of that client for accessing that data block at the one or more nodes.

13. The computer program product of claim 12, wherein, for the data block of the plurality of data blocks, generating the node assignment of the node of the plurality of nodes for that data block includes:
providing, as input to a machine learning model, the (i) the plurality of read latencies associated with the plurality of nodes, (ii) the number of clients that accessed that data block at the one or more nodes in the prior time period, (iii) the total number of times that that data block was accessed at the one or more nodes in the prior time period, and (iv), for each client of the number of clients that accessed that data block at the one or more nodes, the network latency of that client for accessing that data block at the one or more nodes; and
receiving, as output from the machine learning model, the node assignment of the node of the plurality of nodes for that data block.

14. The computer program product of claim 11, wherein the program instructions, when executed by the at least one processor, further cause the at least one processor to:
for each data block of the plurality of data blocks, continuously or periodically perform the dynamic data allocation.

* * * * *

UNITED STATES PATENT AND TRADEMARK OFFICE
CERTIFICATE OF CORRECTION

PATENT NO. : 12,360,812 B2
APPLICATION NO. : 18/844249
DATED : July 15, 2025
INVENTOR(S) : Shivam Mohan et al.

Page 1 of 1

It is certified that error appears in the above-identified patent and that said Letters Patent is hereby corrected as shown below:

In the Claims

Column 23, Line 54, Claim 2, delete "that that" and insert -- that --

Column 24, Line 9, Claim 4, delete "that that" and insert -- that --

Column 25, Line 14, Claim 7, delete "thatdata" and insert -- that data --

Column 25, Line 16, Claim 7, delete "that that" and insert -- that --

Column 25, Line 38, Claim 9, delete "that that" and insert -- that --

Column 26, Line 44, Claim 12, delete "that that" and insert -- that --

Column 26, Line 67, Claim 13, delete "that that" and insert -- that --

Signed and Sealed this
Second Day of September, 2025

Coke Morgan Stewart
*Acting Director of the United States Patent and Trademark Office*